(12) United States Patent
Möller

(10) Patent No.: US 6,971,822 B2
(45) Date of Patent: Dec. 6, 2005

(54) DEVICE FOR DISTRIBUTING AND RECEIVING ARTICLES IN THE FORM OF SHEETS OF PAPER, PARTICULARLY BANKNOTES, DOCUMENTS AND THE LIKE

(76) Inventor: Andreas Möller, Ulzburger Strasse 4, D-22850, Norderstedt (DE)

( * ) Notice: Subject to any disclaimer, the term of this patent is extended or adjusted under 35 U.S.C. 154(b) by 0 days.

(21) Appl. No.: 10/333,367

(22) PCT Filed: Jun. 7, 2001

(86) PCT No.: PCT/EP01/06493

§ 371 (c)(1),
(2), (4) Date: Jun. 27, 2003

(87) PCT Pub. No.: WO02/09048

PCT Pub. Date: Jan. 31, 2002

(65) Prior Publication Data

US 2004/0253061 A1    Dec. 16, 2004

(30) Foreign Application Priority Data

Jul. 20, 2000  (DE) .............................. 200 12 561

(51) Int. Cl.[7] .............................................. B65G 51/26
(52) U.S. Cl. ...................... 406/111; 406/112; 406/186; 406/190
(58) Field of Search ................... 406/111, 112, 186, 406/190

(56) References Cited

U.S. PATENT DOCUMENTS

| | | | |
|---|---|---|---|
| 4,512,688 A | 4/1985 | Hochradel | |
| 4,583,884 A | 4/1986 | Taneda et al. | |
| 4,930,941 A * | 6/1990 | Willey et al. | 406/10 |
| 5,209,609 A * | 5/1993 | Lang | 406/112 |

FOREIGN PATENT DOCUMENTS

| | | |
|---|---|---|
| DE | 200 03 322.0 | 5/2000 |
| EP | 0 690 423 | 1/1996 |
| GB | 2 211 823 | 7/1989 |
| WO | WO 91/00578 | 1/1991 |

* cited by examiner

*Primary Examiner*—Joe Dillon, Jr.
(74) *Attorney, Agent, or Firm*—Wall Marjama & Bilinski LLP

(57) ABSTRACT

An apparatus for the delivery and acception of articles made of a sheet-like material, particularly banknotes, documents, and the like, includes a carrier for the articles which can be conveyed in a tube by means of a flowing gas. The carrier includes two elements movable relative to each other which form a receptacle for the articles to be conveyed and at least one channel extending transversely to the direction of conveyance. In a closed position, the articles are secured in the receptacle and, when in an opened position, the articles are enabled to be transported into and out of the receptacle. A reception and transmission device includes a tube portion in which the carrier is located. The tube portion is provided with a lateral opening adapted to be closed in a largely air-tight manner, the tube portion being provided with a stop for stopping and orienting the carrier relative to the lateral opening. The apparatus further includes a slide for transporting the articles out of and into the carrier wherein the slide is movably supported relative to the tube portion between a retracted position and an extracted position. The slide includes a retaining portion for accepting and retaining the articles with the slide such that when in an extracted position, extending its retaining portion into the channel causes the carrier elements to move into their open position.

12 Claims, 5 Drawing Sheets

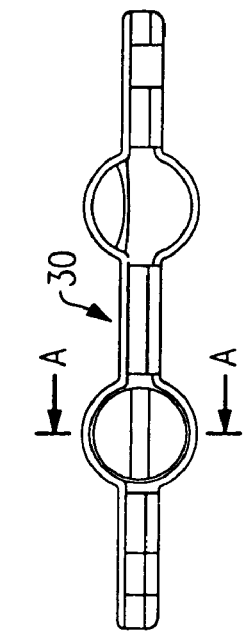
FIG.6a
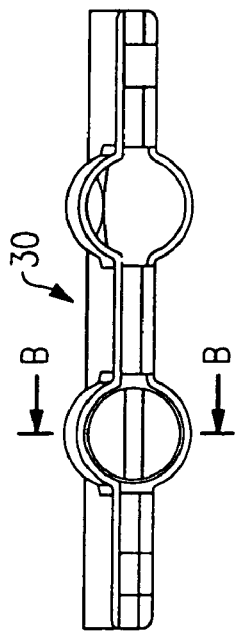
FIG.6b
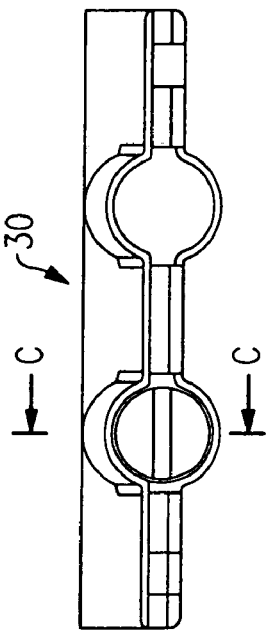
FIG.6c
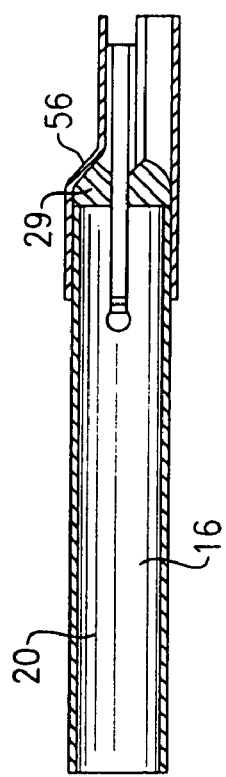
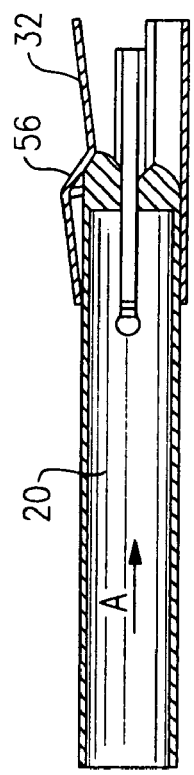
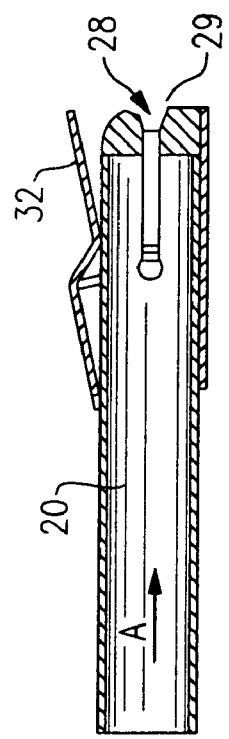

DEVICE FOR DISTRIBUTING AND RECEIVING ARTICLES IN THE FORM OF SHEETS OF PAPER, PARTICULARLY BANKNOTES, DOCUMENTS AND THE LIKE

FIELD OF THE INVENTION

The invention relates to an apparatus for the delivery and reception of articles made of a sheet-like material, particularly banknotes, documents, and the like.

BACKGROUND OF THE INVENTION

In conventional automatic money dispensers, the banknotes are in a secured reservoir of the automatic dispenser. Since the automatic dispensers are sometimes installed outdoors there naturally is a safety risk which is not insignificant. Moreover, the institution running the automatic money dispenser is required to refill the money stocks. There is an increased safety risk during this time.

In this conjunction, DE 200 03 322.0 describes a conveyance system including a conveyance tube through which the money is conveyed by means of an air-operated advancing body. An adjustable delivery drum having a dispenser opening is provided for an access to the money.

A reliable distribution system for banknotes and documents has become known from WO 91/00578. The system has a carrier which is provided with a compartment to receive banknotes and documents. The compartment is filled via a gripper which grasps around banknotes like a pair of pliers and moves them down into the compartment for carriage. The carrier is emptied by rotating it about its longitudinal axis, causing the contents to fall out of it under the action of gravity.

U.S. Pat. No. 4,512,688 has made known a pneumatic tube conveyor system with which a carrier is associated. The carrier concerned is a box-shaped element which is provided with a hinged lid at its upper side. The lid is biased by a spring and is retained in the tube duct by the lid, when in a closed position. The lid of the carrier may snap open in a charging and discharging station.

SUMMARY OF THE INVENTION

It is the object of the invention to provide an apparatus for the delivery and reception of articles made of a sheet-like material, which allows to safely transport the articles in a tube system while ensuring a simple and reliable delivery and reception of articles.

The object is achieved by the present invention.

According to the invention, the apparatus comprises a carrier, a reception and dispatch device, and a slide. The carrier receives the objects to be conveyed and can be moved through a tube by means of a flowing gas. The carrier has a receptacle in which the articles to be conveyed are arranged for carriage. The reception and dispatch device is provided with a tube portion in which the carrier is for the delivery and reception of the articles. The tube portion is provided with an opening through which the articles are arranged in the carrier and may be dispensed therefrom. The tube portion has provided therein a stop means for stopping the carrier. The stop means retains the carrier in the tube portion in such a way that the carrier is aligned with the opening of the tube portion. The articles arranged in the receptacle of the carrier are transported out of the carrier and into the carrier via a slide. The carrier is provided with at least one channel extending transversely to the direction of conveyance and, when in its extracted position, is shifted into the channel in between the elements of the carrier. At its free end, the slide has a portion retaining the articles. In a retracted position, the slide releases the carrier, enabling the carrier to be conveyed inside the tube portion.

When the slide carries out a displacing motion from the retracted position to its extracted position an article arranged in the receptacle of the carrier will be gripped by the retaining portion of the slide and will be advanced through the opening. An article arranged in the carrier will be moved out of the tube portion via the slide and may be grasped by a user there. If articles are received there will be a contrary procedure: When the slide carries out a displacing motion from its extracted position to its retracted position an article retained in the retaining portion of the slide will be arranged between the elements of the carrier through the opening of the tube portion. The slide, while moving to its advanced position, causes the elements to move to their opened positions at this stage. The inventive apparatus has the advantage that articles which are transported by means of the carrier in a tube system can be delivered and be received again by the slide in a reliable manner. The slide will open the carrier during this procedure.

In a preferred embodiment of the invention, the elements each have at least one reception surface which faces the other element. In an aspect, the articles to be conveyed are locked against the reception surface of the other element so that the articles, while being transported, are locked between the elements of the carrier. Alternatively, it is also possible for the reception surfaces, in the closed position, to be arranged in parallel with each other to form a reception compartment for the articles.

For an efficient conveyance of the carrier in a tube system, each element of the carrier is provided with a body substantially of a disk shape one side of which defines the reception surface and the opposite side of which is provided with one or more protrusions located transverse to the direction of conveyance with the protrusions being of a width and height adapted to the tube cross-section. In this aspect of the carrier, the carrier is substantially composed of two separate disk-shaped bodies which oppose each other in their respective contact surfaces and from which, transversely to the direction of conveyance, a protrusion extends the width and height of which is adapted to the tube cross-section to enable the flowing gas to take hold of and convey the carrier. Alternatively, a protrusion may also be provided at the end of the carrier which is in the direction of conveyance and at the one which is opposed thereto.

To ensure an efficient conveyance of the carrier in a tube system, each protrusion is provided with a sealing element along its circumference facing the tube wall. The sealing element bears on a tube inside wall, thus ensuring a sufficiently large pressure differential of the flowing gas medium to convey the carrier through a tube.

For a delivery of articles from and reception thereof in the conveying element, the two elements are provided with the channel oriented transversely to the direction of conveyance for a reception of the slide. An access of the slide to the articles arranged in the carrier becomes possible through the channel. When in its extracted position, the slide extends fully or partially through the carrier. Note that the channel is preferably formed from indentations opposed to each other in each of the elements. The indentation in a first element preferably extends across the whole width transversely to the direction of conveyance and the opposite indentation extends across some part of the width of the element and, in a ramp-shaped portion, passes over into the reception surface of the element.

In a preferred embodiment, the channel has the tapering cross-section at its side facing the opening of the tube section.

In a preferred aspect of the inventive device, the slide has one or more bars the retaining portion of which each has a slot disposed in parallel with the reception surface for accepting the articles. When the slide is passed through the carrier from its retracted position the slots will receive the article arranged in the carrier. When the slide is further moved forward the articles arranged in the contact surface will be taken up by the slot and the articles taken up by the slot are moved along from the carrier so that they may be gripped by a user through the opening disposed in the tube section. If articles are to be received these may be arranged by the user in the slot of the slide. The articles may also be placed in a compartment from which the slide will then remove and carry along the articles. This version is preferred to placing the articles directly. If the articles are carried along while the slide is being retracted they will remain in the carrier when the slide is retracted from the carrier. To retain the articles arranged in the slot of the slide inside the carrier while the slide is being retracted a stop element may be provided on the carrier at the side facing away from the opening of the tube portion. It is specifically for securing the articles while the slide is being retracted that a holding device may be provided for the articles arranged in the slot at the free end of the slot.

In a preferred aspect of the tube portion, its opening can be closed by a lid hinged to the tube portion. When the slide is in its extracted position the lid has preferably been turned out of its position covering the opening of the tube portion. To this end, the lid is lifted by the extracted slide over the carrier which is opening so that articles may be delivered or received.

In an advantageous further aspect of the invention, the tube portion is provided with means to produce a flow of gas. This allows the carrier to be conveyed in the tube portion irrespective of other connections with the means being preferably such as to produce a flow of gas in the two directions of the tube portion.

It is preferred to provide the carrier with a spring means which biases the elements of the carrier to the closed position with the articles to be transported being preferably locked in between the elements.

BRIEF DESCRIPTION OF THE DRAWINGS

A preferred embodiment of the inventive apparatus will be described in more detail below with reference to the accompanying drawings. In the drawings:

FIGS. 6a to 6c illustrate a front view of the carrier and sections thereof taken along lines A—A, B—B, and C—C with the slide differently far advanced.

DETAILED DESCRIPTION

Figure 1:
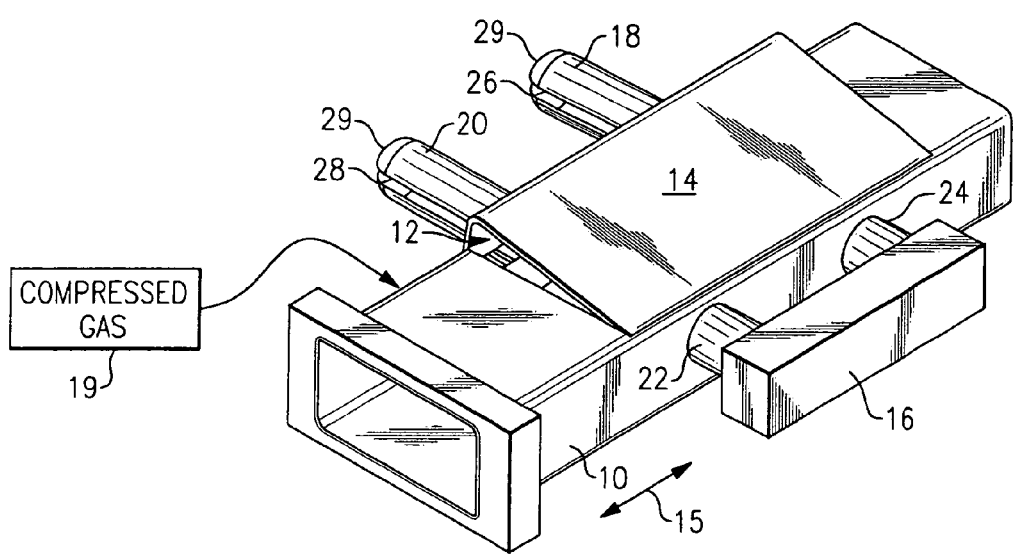
FIG. 1 is a perspective view of an inventive apparatus with the slide extracted.

FIG. 1 shows a tube portion 10 which has substantially rectangular cross-section. The tube portion 10 has a lateral opening 12 which can be closed by a hinged lid 14. A carrier 30 (FIG. 2) is moved by compressed air, shown as 19, in the tube portion 10 in the direction 15.

Arranged transversely to the direction of conveyance 15 is a slide 16 which has two arms 18 and 20. In the position illustrated in FIG. 1, the arms 18 and 20 are passed through the tube portion 10 and the opening 12. At the side opposed to the opening, the tube portion 10 is provided with bores 22 and 24 for the arms of the slide. Each arm 18 and 25 is provided with a slot 26 and 28, respectively, which are aligned in parallel with each other. The arms 18 and 20 are of a cross-section which is substantially circular and tapers towards the free end of the arms.

Figure 2:
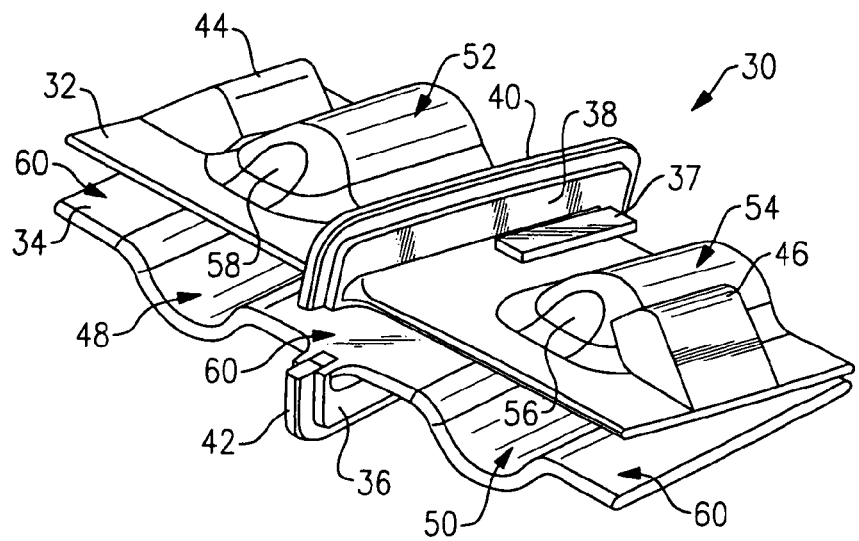
FIG. 2 depicts an inventive carrier in a partially turned-open position.

Arranged in the tube portion and covered by the lid 14 is a carrier 30 as is illustrated in FIG. 2. The carrier 30 is composed of two elements; namely, an upper element 32 and lower element 34, which are shown partially folded apart in FIG. 2. Each element is composed of a substantially rectangular body from which a protrusion 36 and 38 each extends. The protrusions are dimensioned such as to match the cross-section of the tube portion 10 when the 30 is in the folded-in condition. The protrusions 36 and 38 have passed therearound a sealing element 40 and 42 each which is placed in a groove extending around the protrusion. The protrusions 36 and 38 are arranged approximately centrally in relation to the direction of carrier conveyance. The sealing elements 40, 42 are connected to each other at the side which is shown hidden to define a stop for the articles.

If the carrier is conveyed in a tube portion of a rectangular cross-section, the protrusions 36 and 38 constitute the resistance to which the compression force is applied. The upper element 32 has stops 44 and 46 which are arranged each at the end of the carrier that faces to the direction of conveyance. The stops 44 and 46 come to bear on the inner wall of the tube portion, if the tube in which the carrier 30 is conveyed performs an appropriate bend. This reduces the angle of inclination of the carrier 30 in the bend because one of the stops 44 and 46 abuts against the inner wall of the tube portion.

The lower element 34 has two indentations 48 and 50 arranged in parallel with each other on different sides of the protrusions 36. The indentations are of a substantially semi-circular cross-section and extend across the whole width of the element 34. Indentations 52 and 54 are arranged in opposition to the indentations 48 and 50. The indentations 52 and 54 extend across one part of the upper element 32 and open into a ramp-shaped portion 56 and 58 each which passes over into the upper element 32. The indentations 48 and 50, along with the ramp-shaped portion 58, define a channel extending transverse to the direction of conveyance 15, FIG. 1, the cross-section of which tapers.

Figure 3:
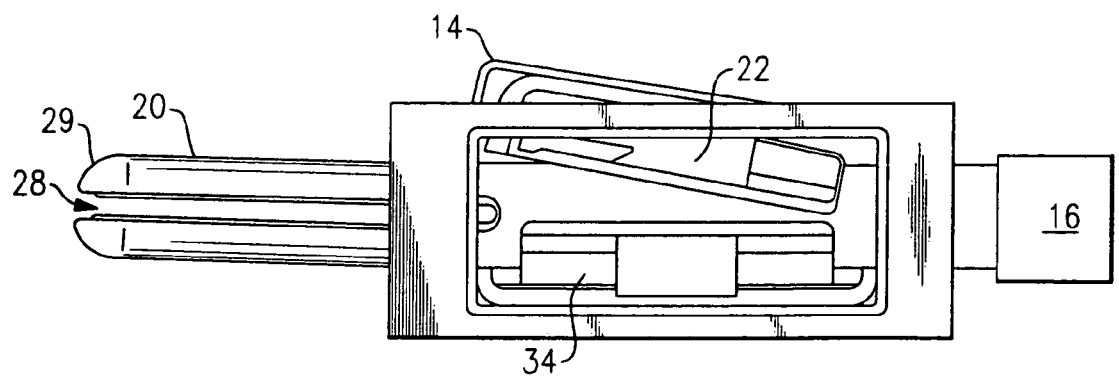
FIG. 3 is a side view of the inventive apparatus with the slide extracted.
Figure 4:
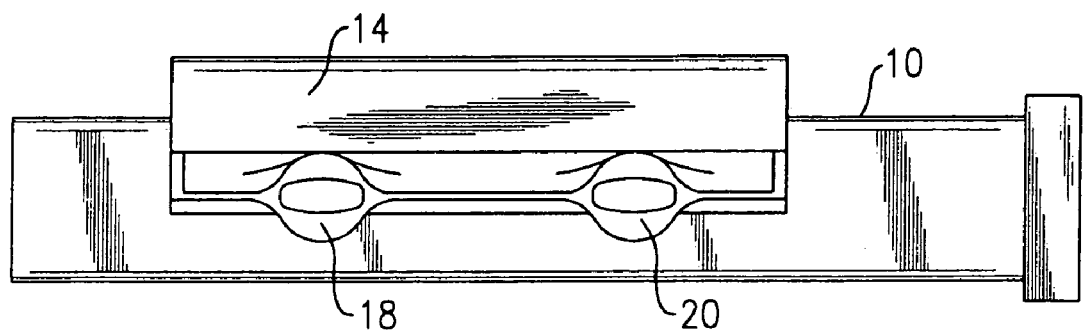
FIG. 4 is a front view of the inventive apparatus with the slide extracted.
Figure 5:
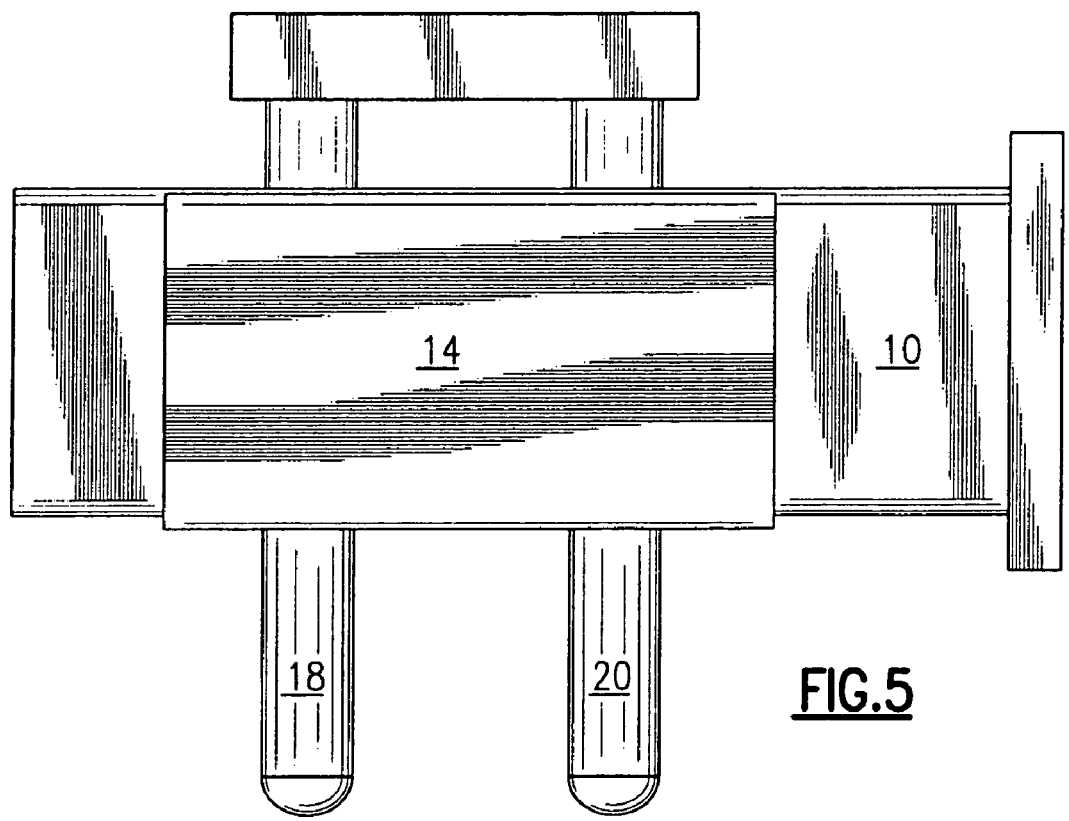
FIG. 5 is a top view of the inventive apparatus with the slide extracted.

The interaction between the arm 20 of the slide 16 and the carrier 30 will be evident from the view of FIG. 3. The advanced arm 20 of the slide 16 extends between the elements 32 and 34. The arm 20 has borne thereon the ramp-shaped portion 56 so that the elements 32 and 34 are folded apart. The lid 14 is turned open by the upper element 32. At this stage, the lid 14 which is biased by a spring may be in its closed position sealing the tube portion 10. In the position shown in FIG. 3, when banknotes are introduced into the slot 28 they are carried along into the carrier 30 if the slide 16 is moved to the retracted position. When the arm 20 gets into the indentation 54 of the element 32, the carrier 30 will be closed, causing the banknotes to be locked in between the surfaces 60 of the lower element 34 and the respective opposite surfaces of the upper element 32. During this operation, the lid 14 will cover the opening 12 so that the banknotes can subsequently be conveyed inside the tube portion 10 by means of the carrier.

FIGS. 6a to 6c show how the carrier 30 is opened during the advancing motion of the slide 16. For more clarity, the 5 protrusions located transversely to the direction of conveyance are not shown on the carrier 30. The advanced arm (only arm 20 is shown herein) of the slide 16 causes its retaining portion 29 in FIG. 6a to get in contact with the ramp shaped portion 56. Further advancement in the direction of the arrow A in FIG. 6b results in the upper carrier element 32 being spread apart. The lifted upper element 32 may cause the hinged lid 14 to be lifted in the tube portion 10. If the slide 16 continues to be advanced in the direction A of FIG. 6c, the upper element 32 will continue to open and banknotes or other documents which are locked between the elements will be advanced so that they may be gripped by a user. If the slide 16 moves in the direction of the arrow A, the banknotes arranged in the carrier 30 are received by the slot 28 of the contact portion of the arm 20 and will be advanced therein in order to be gripped by a user. A reception of banknotes takes place in an inverse order by a retraction of the arm 20. For the retaining portion, it proves to be an advantage that documents or banknotes which were not withdrawn are properly re-arranged in the carrier 30 automatically during a retracting motion and can be safely moved to an appropriate location.

Figure 7A:
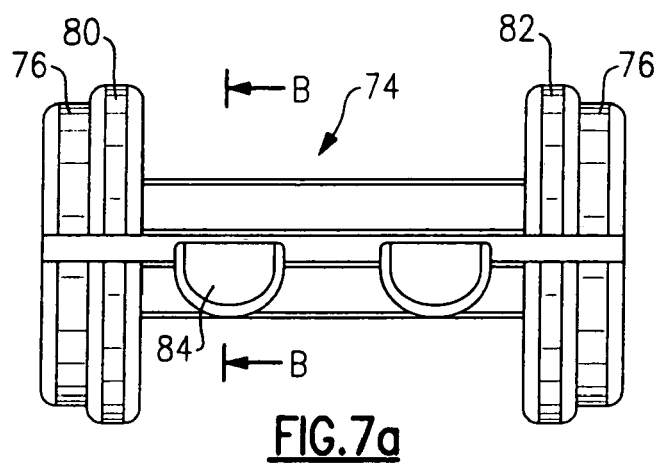
FIGS. 7a and 7b depict a front view and a sectional view taken along line B—B of an alternative carrier having two protrusions.
Figure 7B:
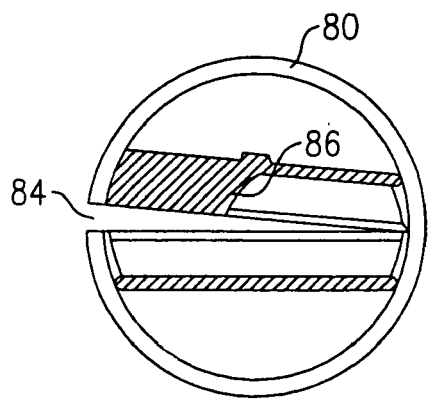

FIGS. 7a and 7b show a carrier 74 of an alternative design which is provided with two protrusions 76 and 78 for conveyance inside the tube. The protrusions 76 and 78 are also provided with a rubber seal 80 and 82, respectively. The design of the carrier 74 is such as to be a substitute for respective tin boxes in pneumatic tube conveyors which already exist. This makes it possible to employ the carrier in pneumatic tube conveyors, which already exist, with their tube switches and conveying devices.

FIG. 7b shows a section taken along the line B—B of FIG. 7a. The section runs through a channel 84 the cross-section of which tapers at the slope 86. The arm of a slide that is pushed into the channel 84 interacts with the slanting contact surface 84 to cause the carrier to open and to enable banknotes and documents arranged between the carrier elements to be pushed out of the elements.

Figure 8:
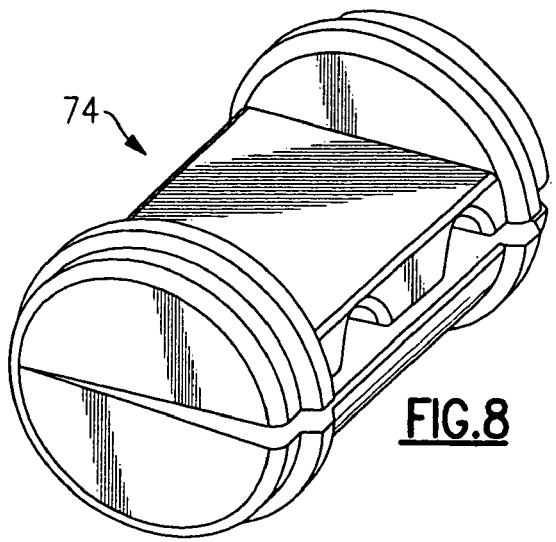
FIG. 8 is a perspective view of the alternative carrier.

FIG. 8 shows a perspective view of the carrier 74 of FIG. 7a.

Both the carrier 74 and carrier 30 may be provided with spring means (only spring means 37 being shown in FIG. 2) which bias the carrier to its closed position, In the closed position, the articles to be transported are preferably locked between the two carrier elements.

What is claimed is:

1. An apparatus for the delivery and reception of articles made from a sheet material, said articles including at least one of the group consisting essentially of banknotes and documents said apparatus comprising:

a carrier for the articles which can be conveyed in a tube by means of a flowing gas, said carrier having two elements movable relative to each other which form a receptacle for the articles to be conveyed and at least on channel extending transversely to the direction of conveyance, said carrier being movable between a closed position and an opened position such that when in the closed position, said carrier secures the articles in the receptacle and, when in the opened position, said carrier enables the articles to be transported into and out of the receptacle, a reception and dispatch device having a tube portion in which the carrier is located, said reception and dispatch device having a lateral opening adapted to be closed by adjustable closing means when the carrier is in the closed position, said adjustable closing means closing the tube portion in a largely air-tight manner, said tube portion being provided with a stop means for stopping and orienting the carrier relative to the lateral opening, and a slide for transporting the articles out of and into the carrier the slide being movably supported relative to the tube portion between a retracted position and an extracted position, said slide having a retaining portion for receiving and retaining the articles with the slide, such that when in the extracted position, said slide extends extending said retaining portion into the channel and causes the elements of the carrier to move into the opened carrier position.

2. The apparatus as claimed in claim 1, wherein the elements of said carrier each include at least one reception surface which faces the other element.

3. The apparatus as claimed in claim 2, wherein each element of the carrier is defined by a substantially disk-shaped body, one side of said body defining the reception surface and the opposite side having at least one protrusion adapted to the tube cross-section.

4. The apparatus as claimed in claim 3, wherein one protrusion is centrally disposed in the direction of conveyance.

5. The apparatus as claimed in claim 2, wherein the channel is defined by a pair of opposed indentations formed in each of the elements of the carrier with the channel cross-section tapering towards one side.

6. The apparatus as claimed in claim 5, wherein the indentation in a first carrier element extends across the whole width transversely to the direction of conveyance with the opposite indentation in the second carrier element extending over at least a portion of the width of the element and, in a ramp-shaped portion, passes over into the reception surface of the second element.

7. The apparatus as claimed in claim 6, wherein the slide, when advanced into the channel, bears on the ramp-shaped portion of the second carrier element such that the second carrier element is spread apart from the first carrier element and the second carrier element actuates the closing means for the opening.

8. The apparatus as claimed in claim 2, wherein the slide includes at least one arm, a retaining portion of said at least one arm being provided with a slot disposed in parallel with the reception surface of the two elements of said carrier for accepting the articles in the retaining portion.

9. The apparatus as claimed in claim 1, wherein the closing means for the opening of the tube portion includes a lid which is hinged to the tube portion.

10. The apparatus as claimed in claim 1, wherein the tube portion is provided with means for selectively producing a flow of gas in either direction of conveyance.

11. The apparatus as claimed in claim 1, wherein the carrier includes a spring means which biases the elements of said carrier into the closed position.

12. The apparatus as claimed in claim 2, wherein the articles to be transported, in the closed position, are locked between the reception surfaces of the carrier elements.

* * * * *

UNITED STATES PATENT AND TRADEMARK OFFICE
CERTIFICATE OF CORRECTION

PATENT NO. : 6,971,822 B2
DATED : December 6, 2005
INVENTOR(S) : Andreas Möller

It is certified that error appears in the above-identified patent and that said Letters Patent is hereby corrected as shown below:

<u>Column 4,</u>
Line 13, replace "25" with -- 20 --.

Signed and Sealed this

Twenty-third Day of May, 2006

JON W. DUDAS
*Director of the United States Patent and Trademark Office*